(No Model.)

J. F. & H. G. CHANDLER.
SAW GUIDE.

No. 266,968. Patented Nov. 7, 1882.

Witnesses:
B. Ford
J. L. Stanyan

Inventors:
Jacob F. Chandler
Henry G. Chandler
per J. B. Thurston
Attorney.

UNITED STATES PATENT OFFICE.

JACOB F. CHANDLER AND HENRY G. CHANDLER, OF CONCORD, N. H.

SAW-GUIDE.

SPECIFICATION forming part of Letters Patent No. 266,968, dated November 7, 1882.

Application filed August 24, 1882. (No model.)

*To all whom it may concern:*

Be it known that we, JACOB F. CHANDLER and HENRY G. CHANDLER, both of the city of Concord, county of Merrimack, and State of New Hampshire, have invented a new and Improved Saw-Guide; and we hereby declare the following to be a full and clear description thereof.

The object of our invention is to so construct the guide that in sawing irregular work—such as cutting hoops from poles for use in cooperage—the saw is caused to follow any uneven surfaces that may present themselves on the outside of the pole—such as knots, projections of any kind, or cavities—and thereby leave the strap or hoop which is sawed from the pole of a perfectly even and uniform thickness throughout its entire length, which obviates the necessity of planing said hoops or straps after being sawed from the poles.

The nature of our invention is such that the bed-plate upon which the improved saw-guide is movably attached may be screwed into position upon the table of any so-called "band-saw" now in use, and by so doing enable said band-saw to saw off hoops or straps from poles, which will be at once suitable and ready for use upon barrels, hogsheads, and tubs.

Figure 1:
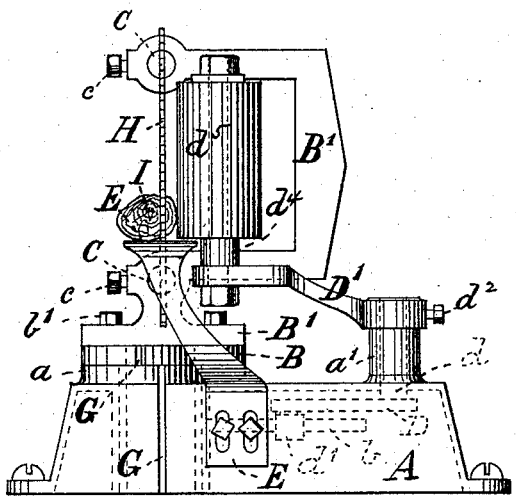
Figure 2:
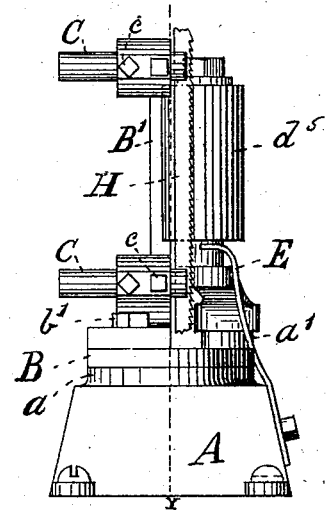
Figure 3:
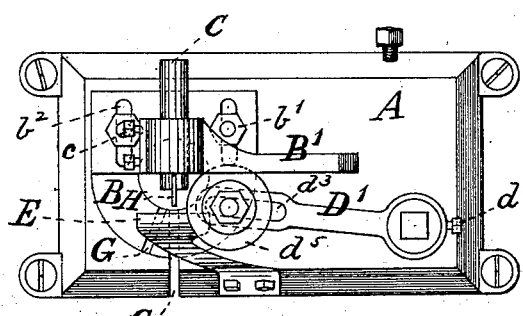
Figure 4:
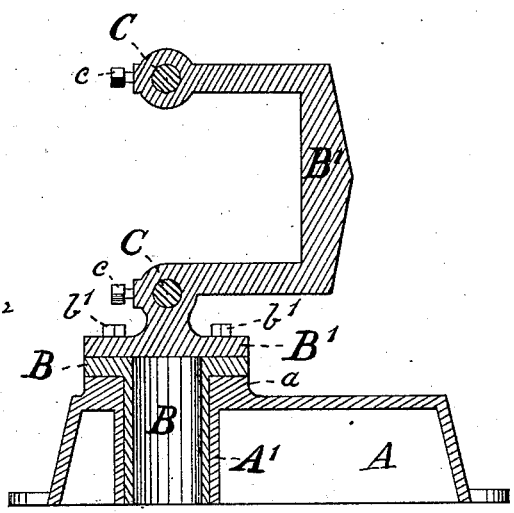
Figure 5:
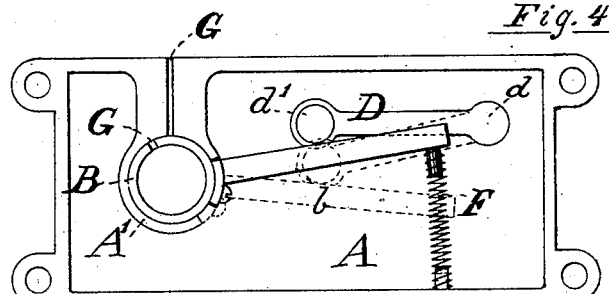

The invention will be readily understood by reference to the accompanying drawings, of which Figure 1 is a front elevation of the improved saw-guide, showing a section of a saw in position. Fig. 2 is a side elevation of the improved saw-guide. Fig. 3 is a plan of Fig. 1. Fig. 4 is a longitudinal sectional view taken on line Y Y of Fig. 2. Fig. 5 is an inverted plan of the improved saw-guide, showing all the mechanism contained within the bed-plate.

The bed-plate A may be of cast-iron, and may be of any desired shape or ornamental design, upon the top of which will be cast the seats $a$ and $a'$, upon which will be secured respectively the movable arms $B'$ and $D'$. The inside of the bed-plate A will be hollowed out, so as to leave the metal in top and sides of about one-quarter inch thickness, excepting at $A'$, where there must be provision made in the casting for a vertical hole extending from the top nearly to or flush with the bottom, for the reception of a swivel-piece, as shown best in Fig. 4, and which will be hereinafter more fully described.

The swivel-piece B is journaled into the bed-plate at $A'$, and the actuating-lever $b$ may be screwed to the bottom of said piece B; or it may be screwed to its side, as illustrated, Figs. 1 and 5, the object in view being only to oscillate said swivel-piece. Projecting from the opposite side of lever $b$ will be a spring, F, which, being held against the side of the bed-plate A, as shown in Fig. 5, will keep said lever $b$ a certain distance from either side of bed-plate A and allow it to be always in readiness for use.

The swivel-piece B is made hollow for the purpose of letting the sawdust through it, and at the top is a flange, to which is attached, by means of set-screws $b'$ and slots $b^2$, the arm $B'$, for the purpose of varying the position of the arm $B'$ forward or backward upon the swivel-piece B; but this mode of construction is not at all essential to the perfect operation of the machine, as the swivel-piece B and arm $B'$ may be cast in one piece, and still the same result would be obtained if fitted properly in the machine. We prefer, however, the construction shown in the drawings.

The saw-guides C C, preferably made of any hard wood, are passed through holes shown in the movable arm $B'$, and may be set at any point desired by the operator by the means of set-screws $c$ $c$. The lever D is provided near one end with a small friction-roll, $d'$, projecting from its bottom, the other end being its point of fulcrum $d$, and upon this fulcrum-pin, on the outside of the bed-plate A, is fitted the lever $D'$, which is retained at any desired angle with the aid of set-screw $d^2$. At the other end of lever $D'$, and extending back perhaps one-quarter its length, is a slot, $d^3$, into which is placed the spindle $d^4$, and upon which the friction-roll $d^5$ is permitted to revolve.

The rest E may be secured at any point most convenient upon the front of bed-plate A, providing the top of it be brought into line with the saw and extending a little more to the left than to the right of it, the object of the rest E being merely to afford something upon which the pole or stick to be sawed may slide, and its position should be close to and at the same time in front of the saw.

The spring F should be so placed between the end of the lever $b$ and a side of the bed-plate A that said lever $b$ will be held at some predetermined point until the swivel-piece B is required to oscillate, at which time the spring F will be compressed, and will remain so more or less until lever b is allowed to return to its position of rest.

The slots G G are provided for the purpose of allowing the saw to be passed into the guides C C through the bed-plate A and swivel-piece B without necessitating the removal of a saw from the wheels upon which it is carried while in actual use upon an ordinary band-saw.

H is a section of a band-saw as it would appear in our improved saw-guide when ready for use, and shown in Figs. 1, 2, and 3.

The construction of our improved saw-guide having been described, its operation is very easily explained. Having first removed the rest E, the improved saw-guide may be placed back of the saw, upon any ordinary band-saw table, and by drawing said saw-guide device forward (being careful to keep the slot G in line with the saw, and having previously caused the swivel-piece B to oscillate by pushing arm B' backward and around far enough to bring slots G G on line with one another) the band-saw H will be permitted to enter and pass through slot G in bed-plate A, slot G in swivel-piece B, and into the saw-guides C C, after which our improved device will be ready to be screwed down upon the band-saw table.

To saw hoops from poles with our improved device it is only necessary to place a pole, I, upon the rest E, allowing it to bear somewhat against the roll $d^5$, as shown in Fig. 1 of the drawings, and by feeding it gently forward onto the saw H any knots, projections, or cavities appearing upon the surface of said pole I will cause the roll $d^5$ to vibrate the lever D', which, by means of its fulcrum d, will transmit a like motion to lever D, and by aid of friction-roll d' to lever b, spring F, swivel-piece B, and movable arm B'. By these means the saw H is caused to follow any of the hereinbefore-mentioned irregularities upon the surface of the pole I, and thereby saw off a strip which will be of uniform thickness from end to end, and sufficiently smooth for immediate use upon barrels or hogsheads without further preparation.

In Fig. 5 is shown by dotted lines the limit of movement of levers b and d', and the oscillation of swivel-piece B.

Having thus described our invention, we claim—

1. The movable arm B', to which are attached the adjustable saw-guides C C, secured in any desired lateral position by set-screws c c, said arm B' being adjustably fastened to the swivel-piece B by means of set-screws b' and slots $b^2$, said swivel-piece B being oscillated by lever b, in combination with levers D D', friction-roll $d^5$, spindle $d^4$, and bed-plate A, to which is adjustably attached the rest E, as drawn and described, and for the purpose set forth.

2. The arm B', with its saw-guides C C, oscillated by and in combination with arms or levers D D', spindle $d^4$, friction-roll $d^5$, swivel-piece B, and spring F, all arranged to operate within and upon the bed-plate A, as herein described.

3. The lever D, fulcrumed at d, and friction-roll d', in combination with lever D', provided with set-screw $d^2$, slot $d^3$, spindle $d^4$, and friction-roll $d^5$, operating as herein described and set forth.

4. The swivel-piece B, journaled into the bed-plate at A', actuated by lever b, held in a position of rest by a suitable spring, F, all arranged for the purpose of oscillating the arm B', which may be adjustably fastened to swivel-piece B by means of set screws b' and slots $b^2$, as herein described and set forth.

JACOB F. CHANDLER.
HENRY G. CHANDLER.

Witnesses:
J. B. THURSTON,
J. L. STANYAN.